Figure 2:

May 20, 1958 R. J. SWARTZ ET AL 2,835,433
BAG CLOSURES
Original Filed July 21, 1950

INVENTOR.
JAMES E. SNYDER
BY RUBY JEAN SWARTZ
*R. L. Miller*
Attorney

United States Patent Office 2,835,433
Patented May 20, 1958

---

2,835,433

BAG CLOSURES

Ruby Jean Swartz and James E. Snyder, Akron, Ohio, assignors to Wingfoot Corporation, Akron, Ohio, a corporation of Delaware Original application July 21, 1950, Serial No. 175,253. Divided and this application April 12, 1955, Serial No. 500,960

2 Claims. (Cl. 229—62)

This invention relates to improvements in bags, and more particularly bag closures.

With the advent of heat-sealable wrapping materials many bags formed from tubular stock, after filling, are closed by spreading the mouth of the bag and sealing the two walls together by heat and pressure. This produces so-called "ears" at each upper corner of the bag. In packing bags of this type in a carton it is customary in certain plants to fold the ears flat against the top of the bag. Whether this is done or whether the ears are allowed to protrude, the bag makes an untidy appearance.

It is known that certain of the physical properties of plastic film, such as its tensile strength and tear resistance, can be improved by orienting the molecules or molecular aggregates of which the film is composed. Orientation occurs in extruded films and in cast films which have been stretched. On heating, oriented films shrink.

According to this invention the objectionable ears are eliminated by making the bag from oriented film which will shrink at least twenty-five percent in one direction when heat-sealed. Such film may be formed of a single ply of stretched film of the type which is heat-shrinkable. However, the invention is not limited to bags made from single plies of films because laminations which contain one or more heat-shrinkable plies may be employed. It is not necessary that all of the plies of a lamination be thermo-shrinkable because when laminated to a shrinkable ply they shrink with it. One or more of the plies may be nonshrinkable, one or more other plies may be shrinkable in one direction, and one or more other plies may be shrinkable in two directions. Thus, the bags of this invention may be made of single-ply material or from laminated stock, provided only that the bag material is shrinkable by heat to at least twenty-five percent in at least one direction. It may be shrinkable in both directions. The bag is to be made so that when the film is heated to form the closure seal, the heated section will shrink in the direction which decreases the length of the seal across the mouth.

Generally single-ply film which has been stretched in only one direction, viz., widthwise of the bag, is not suitable for the manufacture of bags, because the filled bag splits with the grain when subjected to shipping abuse. Single-ply film which has been stretched in both directions (i. e., longitudinally and laterally) may be used. Laminated films will generally be preferred, and the invention will be explained with special reference to a three-ply film made from an intermediate ply stretched in both directions, and outer plies stretched only laterally. On sealing, this film shrinks so as to decrease the length of the seal across the top of the bag and in this way the ears are greatly reduced or entirely eliminated.

The invention will be further described in connection with the accompanying drawings, in which—

Figure 1:
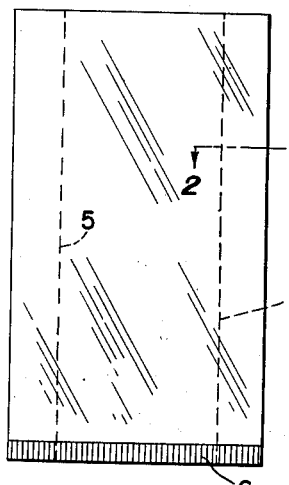
Figure 3:
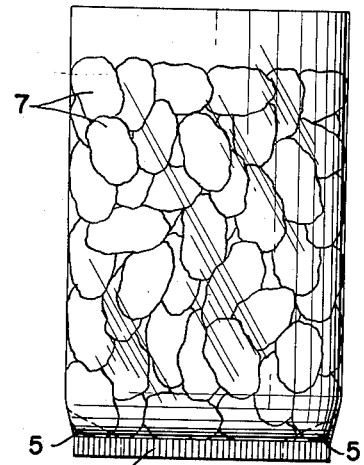
Figure 4:
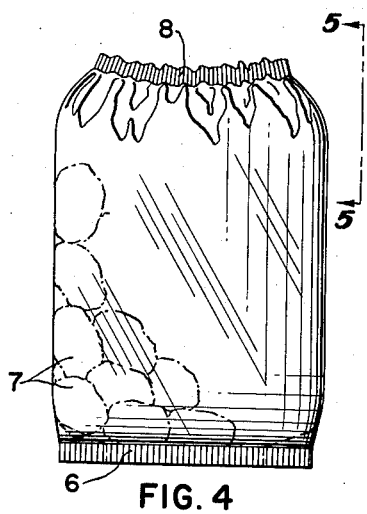
Figure 6:
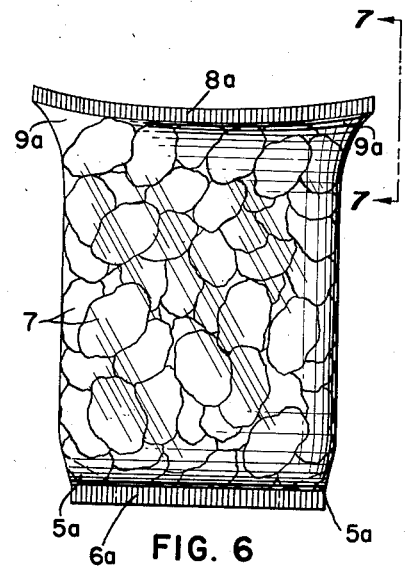
Figure 5:
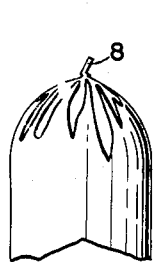
Figure 7:
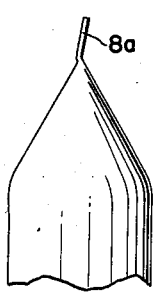

Fig. 1 is a plan view of the bag before sealing;
Fig. 2 is a section on the line 2—2 of Fig. 1;
Fig. 3 is a front view of the filled bag before closing;
Fig. 4 is a front view of the closed bag;
Fig. 5 is an end view on the line 5—5 of Fig. 4;
Fig. 6 is a front view of a bag similarly made from film which will not shrink and shows the objectionable ears at the top corners of the bag; and
Fig. 7 is an end view of this bag of Fig. 6 taken on the line 7—7.

Fig. 1 illustrates the usual plicated type of bag. It is made from a tube of the film material. The film on opposite sides of the bag is folded in at 5, and then the tube is flattened and closed at the bottom 6 in any suitable manner. Adhesive may be employed to form the bottom closure, but, preferably, the bottom closure is made by heat-sealing. If the film is maintained under tension during the formation of the seal and thereafter until the film cools, shrinkage of the film is prevented. (It is customary to keep all heat-shrinkable films under tension during and for a short time after the formation of any heat-seal.)

In the bag illustrated in Fig. 1 the film has been stretched laterally before or during formation of the tube so that when heated to form the closure it will shrink laterally at least twenty-five percent. It is preferably subjected to some longitudinal stretching. If the tube is seamless and has been formed by extrusion, the diameter of the extrusion orifice may be relatively small and the tube immediately after extruding (and while still warm from the extrusion) is stretched by inflation or other means so that the film in the finished bag is stretched laterally to a greater extent than longitudinally. On the other hand, if the bag is made of flat film material, for example a laminated sheet such as that more particularly described in what follows, the bag will include one or more longitudinal seams (not shown).

Thermo-shrinkable films include films made of vinyl polymers, vinylidene polymers, vinyl-vinylidene copolymers, rubber hydrochloride, etc.

As illustrative of the three-ply film which may be used we refer to film prepared as follows:

For the top and bottom plies there is used unstretched rubber hydrochloride film .0008 inch thick containing 2.5 parts of butyl stearate per 100 parts of rubber hydrochloride. For the intermediate ply, three plies of rubber hydrochloride film .0014 inch thick containing 5 parts of butyl stearate per 100 parts of rubber were laminated with heat and stretched longitudinally to a thickness of .0015 inch. These two outer plies of unstretched film and the intermediate ply of longitudinally stretched film are then laminated with heat and stretched laterally until .0009 inch thick. When made into bags with the last stretching of the film widthwise of the bag, when heated to form the closure the film will shrink laterally of the bag about fifty percent. Such film is particularly useful at low temperatures and is described more particularly and claimed in Snyder and Young U. S. application Serial No. 175,254 which has matured into Patent 2,594,229.

The side folds 5 of the bag of Fig. 1 are pushed out when the bag is filled. The folds are ordinarily of such depth that the width of the face of the filled bag is only slightly greater than the length of the seam 6. The bag may be filled with popcorn, candy, or any of a great variety of materials indicated by the reference numeral 7, although the drawing is not intended to limit the size or shape of the materials with which the bag may be filled.

In order to close the filled bag the side folds may be again formed, and if this is done the seal across the top of the bag will resemble the bottom seal 6, assuming, of course, that the seal is formed without shrinking the film material. Such a bag is quite presentable. However, it is expensive to fold the edges of the bag before forming the seam, and the folds at the edges complicate the formation of a tight seal because each end of the seam is made of four plies of the film whereas only two plies are used at the middle of the bag.

If the sides of the bag are not folded in when the closure seal is formed and if the bag is not made of shrinkable material, the length of the seam will be greater than the width of the face of the bag. This is illustrated in Fig. 6. This bag is made of film that does not shrink when heated. The seam 8a across the top of the bag is wider than the seam 6a at the bottom of the bag, the difference in width being equal to the depth of the folds 5a at the sides of the bottom of the bag. This fullness produces the ears 9a at each side of the top of the bag. These ears are unsightly, whether the bag is to be packaged in a carton with other bags similarly formed, or whether it is to be handled separately. The industry generally recognizes the undesirability of these ears.

Fig. 4 illustrates how the ears are done away with, when the bag is made from film which has been stretched laterally and the seal is formed with a straight sealing implement. The amount of stretch which makes an appreciable difference in the appearance of the bag is one which will produce a shrinkage of at least twenty-five percent of the length of the closure seal. Generally a shrinkage of about fifty-five to sixty-five percent will be most desirable. Ordinarily film which shrinks more than seventy-five percent will not be used. The film may shrink longitudinally as well as laterally. Fig. 4 illustrates the type of closure seal which is formed from film which shrinks about fifty percent when the seam is formed. The lateral shrinkage draws the seal tight against the contents of the bag (Fig. 5). On shrinking, the film increases proportionately in thickness.

The seam 8 of Fig. 4 is formed by spreading the mouth of the filled bag (shown in Fig. 3) until the opposite walls of the mouth are in flat contact. The length of the mouth is then longer than the bottom seam 6 by twice the depth of the folds 5 (as explained in discussing the bag illustrated in Fig. 6). The heat used in forming the seal 8 causes the film to shrink to the length illustrated in Fig. 4. This seal is in every respect as moisture- and gas-tight as the unshrunken seal shown in Fig. 6.

The heat used for sealing will depend upon the nature of the film material. For rubber hydrochloride film a temperature around 230–270° F. will ordinarily be used. The pressure employed for making the seal 8 must be released while the film is still hot enough to shrink the desired amount.

The shrinkage of the film produced by heating is mainly limited to the area contacted by the sealing device. The film adjoining the seal 8 is heated sufficiently to cause it to shrink to some extent, and the top of the bag forms a rather uniformly rounded appearance. As the film shrinks down over the contents 7 of the bag irregularities are formed in its surface, as indicated in Figs. 4 and 5.

This application is a division of our application Serial No. 175,253 filed July 21, 1950, now abandoned.

What we claim is:

1. A bag filled and sealed at both ends, the bag being formed form a tubular blank of oriented film, the film being folded in to form a tuck at each end of one seal and then flattened, the other seal being free from re-entrant folds, said latter seal being somewhat shorter than the width of the filled portion of the bag, and the film at the latter seal being thicker and less oriented than the film at both the other seal and at least most of the filled portion of the bag.

2. The bag of claim 1 in which the film of the tubular blank is composed of outer plies of rubber hydrochloride film each originally substantially .0008 inch thick and containing 2.5 parts of butyl stearate per 100 parts of rubber hydrochloride, with an intermediate ply formed of three plies of rubber hydrochloride film each originally substantially .0014 inch thick and containing 5 parts of butyl stearate per 100 parts of rubber hydrochloride which are laminated together by heat and oriented in the direction of the seals at the ends of the bag to a thickness of substantially .0015 inch, with the outer plies heat-sealed thereto and the resulting sheet oriented in the direction of the seals at the end of the bag until substantially .0009 inch thick.

References Cited in the file of this patent

UNITED STATES PATENTS

| | | |
|---|---|---|
| 2,257,823 | Stokes | Oct. 7, 1941 |
| 2,354,590 | Gilfillan | July 25, 1944 |
| 2,392,695 | Rohdin | Jan. 8, 1946 |
| 2,424,536 | Mayer et al. | July 22, 1947 |
| 2,441,940 | Rohdin | May 18, 1948 |
| 2,477,614 | Irons | Aug. 2, 1949 |
| 2,538,025 | Moore et al. | Jan. 16, 1951 |
| 2,594,229 | Snyder et al. | Apr. 22, 1952 |